(No Model.)
J. M. SUTTON.
CULTIVATOR.
No. 368,252. Patented Aug. 16, 1887.
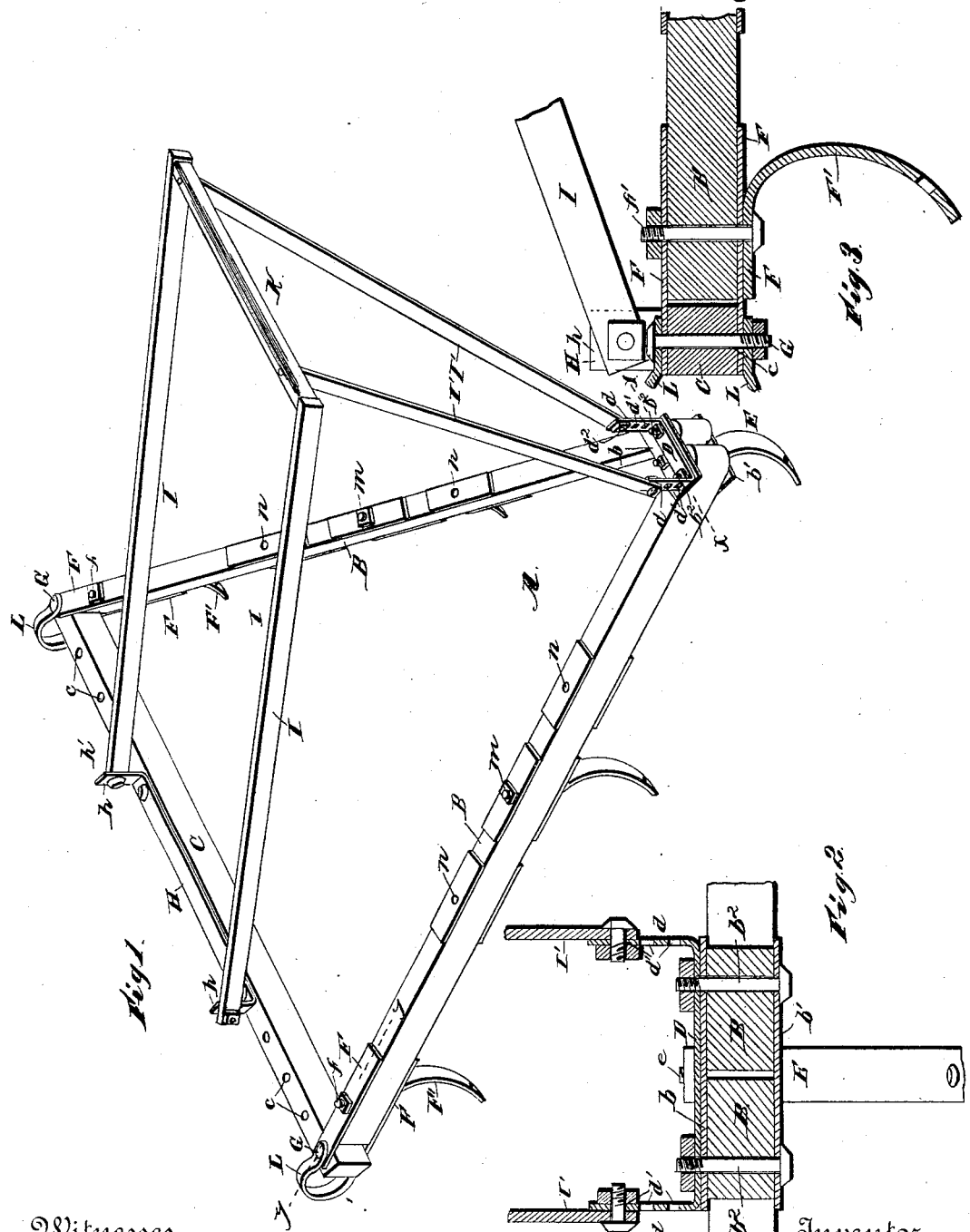
Witnesses
Geo. Thorp.
E. G. Siggers
Inventor
James M. Sutton
By his Attorneys

UNITED STATES PATENT OFFICE.

JAMES MACAULAY SUTTON, OF BRYAN, TEXAS.

CULTIVATOR.

SPECIFICATION forming part of Letters Patent No. 368,252, dated August 16, 1887.

Application filed June 10, 1887. Serial No. 240,919. (No model.)

*To all whom it may concern:*

Be it known that I, JAMES MACAULAY SUTTON, a citizen of the United States, residing at Bryan, in the county of Brazos and State of Texas, have invented a new and useful Improvement in Cultivators, of which the following is a specification.

My invention relates to improvements in cultivators, having for its object the provision of strong and reliable means whereby any desired number of plow-shovels may be used and the distance between the said plows regulated or adjusted at will by very simple means.

A further object is to provide means to enable all the plows, excepting two, to be removed, to adapt the device to be used to lay off rows at a predetermined distance apart to prepare for sowing.

In the drawings hereto annexed is illustrated a cultivator embodying my improvements, in which—

Figure 1 is a perspective view. Fig. 2 is a detail section, line $x$ $x$, Fig. 1. Fig. 3 is a similar view, line $y$ $y$, Fig. 1.

Referring by letter to the drawings, A designates the frame of the cultivator, which is triangular in form, the lateral bars B B comprising the legs of the triangle and the extension-bar C comprising the base thereof. On the upper and lower sides of the rear ends of the bars B B, which come very close together at this point, are secured the plates $b$ $b'$ by the through-bolts $b^2$. The said through-bolts also pass through a plate, D, on the upper side of the plate $b$, the ends of which are turned up to form the ears or standards $d$ $d$, each being provided with a series of perforations, $d'$, for a purpose hereinafter explained. A vertical bolt, $e$, passes through the upper and lower plates, $b$ $b'$, and secures the upper end of the plow-standard E in place.

The front ends of the bars B B are provided with the plates F F, secured on the upper and lower sides thereof by the vertical bolts $f f$, which are also the means of attachment to the said bars of the plow-standards F' F'.

The extension-bar C is disposed transversely of the body of the cultivator and is provided at each end with a series of vertical apertures, $c$ $c$, through which and aligned perforations in the plates F are passed the vertical bolts G G, to secure the front ends of the bars B to the extremities of the bar C. It will be seen that the said bolts G G may be secured in either of the apertures in the extension-bar, and therefore any desired extension of the machine may be made. This is of great importance and advantage, as by this means any desired width or distance may be had between the shovels attached to the standards F' F', and consequently the rows or furrows may be set at the proper distance apart to suit the grain being sown.

A plate, H, is secured to the upper side of the bar C, and the ends thereof are upturned to form ears $h$ $h$, having openings therein, through which are passed the bolts $h'$, to secure the front ends of the handles I to the said ears. Bolts are also passed through the perforations in the standards $d$ $d$ and the lower ends of the braces I', to support the handle-bar K. The extreme rear ends of the said handles are also secured to the transverse handle-bar K in any preferred and suitable manner.

L L designate clevises, which are secured to the vertical bolts G G, and to which are adapted to be secured the draft-animal.

Each bar B is provided with three vertical apertures—namely, the central apertures, $m$, adapted to have a bolt passed therethrough to secure a plow-standard at that point, and the apertures $n$ $n$ in front and rear of the said central aperture, adapted to have bolts passed therethrough to secure standards in place when the central aperture is not in use. It will be seen that the said openings $n$ $n$ are so disposed as to divide the distance between the standards F and the standard E into three equal parts, and therefore when seven plow-shovels are used one will be at the rear and three will be arranged along each bar B at equal intervals thereon.

When it is desired to use the machine merely to lay off the rows for sowing, all the plows, excepting those attached to the standards F' F', are removed and a wheel or roller, O, is attached to the rear end of the machine in a manner similar to that described and shown in my previous patent, No. 352,958, the object being, as in that case, to support the rear end of the device and enable it to move easily.

It will be seen that I herein provide a cultivator which is simple, easily and cheaply made, strong and durable, and readily adjusted in width, and to which may be applied any desired number of plow-shovels, from two to seven. Plates are secured on the upper and lower sides of the bars B B, provided with aligned vertical openings to align with the apertures in the said bars, and through the said aligned openings are passed bolts to secure the standards in place. By loosening the said bolts the standards may be turned to the desired angle to the bars B to align the plows with the motion of the cultivator, and when the said bolts are tightened the standards will be held rigidly in place.

A greater number of plows than seven may be attached to this cultivator if a greater number of vertical apertures are formed in the bars B but the above number will be ordinarily found sufficient.

I claim—

In a cultivator, the combination of the transverse bar C, the side bars, B, having their front ends pivoted to the bar C, the plates $b$ and $b'$ on the upper and lower sides of rear ends of bars B and pivotally bolted, thereby flexibly connecting the rear ends of the said bars together, the plate D, bolted on upper plate, $b$, and having the upturned ends, the plate H, bolted to the upper side of bar C, the handles having their front ends attached to plate H, and the braces I', attached to the handles and having their lower ends attached to and vertically adjustable on the upturned ends of plate D, substantially as described.

In testimony that I claim the foregoing as my own I have hereto affixed my signature in presence of two witnesses.

JAMES MACAULAY SUTTON.

Witnesses:
ISAAC FALKERSON,
H. C. RADFORD.